(12) United States Patent
Albrecht et al.

(10) Patent No.: US 7,792,011 B2
(45) Date of Patent: *Sep. 7, 2010

(54) STORAGE DEVICE AND METHOD FOR SCANNING A STORAGE MEDIUM

(75) Inventors: Thomas Albrecht, Au (CH); Gerd K. Binnig, Wollerau (CH); Evangelos S. Eleftheriou, Zurich (CH); Charalampos Pozidis, Gattikon (CH); Sri M. Sri-Jayantha, Ossining, NY (US); Peter Vettiger, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/138,607

(22) Filed: Jun. 13, 2008

(65) Prior Publication Data

US 2008/0247300 A1 Oct. 9, 2008

Related U.S. Application Data

(63) Continuation of application No. 10/441,798, filed on May 20, 2003, now Pat. No. 7,403,467.

(30) Foreign Application Priority Data

May 23, 2002 (EP) .................................. 02405411

(51) Int. Cl.
*G11B 7/00* (2006.01)
(52) U.S. Cl. ....................................... 369/126; 369/101
(58) Field of Classification Search .................. 369/126
See application file for complete search history.

(56) References Cited

U.S. PATENT DOCUMENTS

| 5,182,724 A | 1/1993 | Yanagisawa et al. |
| 5,225,258 A | 7/1993 | Nakamura et al. |
| 5,394,388 A | 2/1995 | Hatanaka et al. |
| 5,835,477 A | 11/1998 | Binnig et al. |

(Continued)

FOREIGN PATENT DOCUMENTS

EP    0869489 A2    7/1998

(Continued)

OTHER PUBLICATIONS

H.J. Mamin et al., "High-Density Data Storage Using Proximal Probe Techniques," IBM Journal of Research & Development, Nov. 1995, pp. 681-699, vol. 39, No. 6. USA.

(Continued)

*Primary Examiner*—Van N Chow
(74) *Attorney, Agent, or Firm*—Cantor Colburn LLP

(57) ABSTRACT

A storage device and a method for scanning a storage medium. A storage medium for storing data in the form of marks is scanned by an array of probes for mark detecting purposes in a scanning mode. The storage medium has fields with each field to be scanned by an associated one of the probes. At least one of the fields has marks representing operational data for operating the scanning mode. Scanning parameters are computed from the operational data and the scanning mode is adjusted according to the computed parameters.

8 Claims, 6 Drawing Sheets

U.S. PATENT DOCUMENTS

| | | | |
|---|---|---|---|
| 5,856,617 | A | 1/1999 | Gurney et al. |
| 6,043,952 | A | 3/2000 | Liikanen |
| 6,084,849 | A | 7/2000 | Durig et al. |
| 6,195,313 | B1 | 2/2001 | Seki et al. |
| 6,385,608 | B1 | 5/2002 | Mitsuishi et al. |
| 6,542,455 | B1 | 4/2003 | Kuwahara et al. |

FOREIGN PATENT DOCUMENTS

| | | |
|---|---|---|
| JP | 04178938 | 6/1992 |
| JP | 06195770 | 7/1994 |
| JP | 08306095 | 11/1996 |

OTHER PUBLICATIONS

H.J. Mamin et al., "High-Density Data Storage Based on the Atomic Force Microscope," Proceedings of the IEEE Jun. 1999, pp. 1014-1027, vol. 87, No. 6, USA.

P. Vettiger et al., "The "Millipede"—More than one thousand tips for future AFM data storage," IBM Journal of Research & Development, May 2000, p. 323-340, vol. 44, No. 3, USA.

(a)

(b)

STORAGE DEVICE AND METHOD FOR SCANNING A STORAGE MEDIUM

CROSS-REFERENCE TO RELATED APPLICATIONS

This application is a continuation application of U.S. Ser. No. 10/441,798, filed on May 20, 2003, now U.S. Pat. No. 7,403,467, the disclosure of which is incorporated by reference herein in its entirety.

BACKGROUND OF THE INVENTION

1. Field of the Invention

The present invention relates to a storage device comprising a probe array and to a method for scanning a storage medium.

2. Description of Background

New storage concepts have been introduced over the past few years. Exploiting the capability of imaging and investigating the structure of materials down to the atomic scale achieved by scanning tunneling microscopy (STM) and atomic force microscopy (AFM), probes having a tip are being introduced for scanning appropriate storage media, where data are written as sequences of bits represented by indentations and non-indentations. According to latest demonstrations, indentations with a diameter of the range of 30-40 nm have been written on appropriate storage media. Hence, these data storage concepts promise ultra-high storage areal densities.

First approaches are disclosed in "High-density data storage using proximal probe techniques" by H. J. Mamin et al., IBM Journal Research Development, Vol. 39, No. 6, November 1995. A single tip of an AFM cantilever is placed in contact with a rotating surface of a polycarbonate storage medium. Indentations or non-indentations written on the storage medium represent bits. Writing on the storage medium is accomplished by heat With the tip being in contact with the storage medium, the heated tip softens the polymer surface. As a force is applied to bring the tip in contact with the surface, the tip creates a small indentation. A mechanical reading mechanism is adopted. As the tip rides over the surface of the storage medium, a topographic indentation causes a deflection of the cantilever. This deflection is detected using a standard optical sensor.

"Mark" as used herein is understood as physical representation of an information unit. Referring to the storage device according to Mamin et al., marks are indentations and non-indentations for instance. Marks representing data are usually aligned along a track due to the movement of a probe while writing data. Tracking refers to controlling the position of the tip, such that it is always positioned over a track centerline of the track. Mamin et al. fill in servo or tracking marks in the data track at specific locations. These tracking marks are placed among data marks. Data marks and tracking marks are alternating. The tracking marks are used for feedback as to whether the tip is on one side of the track centerline or on the other side and by how much it deviates from the track centerline. The tracking marks cover roughly fifteen percent of the track length.

"High-Density Data Storage Based on the Atomic Force Microscope", by H. J. Mamin et al., Proceedings of the IEEE, Vol. 87, No. 6, June 1999, discloses another single tip based storage device with a rotating disk as storage medium. A single tip of an AFM cantilever is placed in contact with a rotating surface of a polycarbonate storage medium. Indentations or non-indentations in the storage medium represent bits. Writing is accomplished by heating the tip electrically via two conducting legs, which are connected with the tip. Reading is accomplished with a piezoresistive sensor, sensing the deflection of the cantilever when scanning an indentation. Tracking is accomplished by providing a special cantilever structure: The cantilever is provided with vertical ribs for detecting lateral deflections of the cantilever. These deflections are measured piezoresistively.

"The Millipede—More than one thousand tips for future AFM data storage" by P. Vettiger et al., IBM Journal Research Development, Vol. 44, No. 3, May 2000, shows a data storage device based on a mechanical x-/y-scanning of a storage medium with an array of probes each having a tip. The probes scan associated fields of the storage medium in parallel, so high data rates can be achieved. The storage medium comprises a thin polymethylmethacrylate (PMMA) layer. The probes scan the polymer layer in a contact mode. The contact mode is achieved by applying small forces to the probes so that the tips of the probes can touch the surface of the storage medium. Spring cantilevers carry the sharp tips on their end section. Indentations or non-indentations in the polymer layer represent bits. The cantilevers respond to these topographic changes in the surface.

Indentations are written on the polymer surface by thermomechanical recording, where the local probe is heated with a current or voltage pulse during the contact mode, so that the polymer layer is softened locally where the tip touches the polymer layer. The result is a small indentation in the layer, the indentation having nanoscale diameter. Reading is also accomplished by a thermomechanical concept. The heater cantilever originally used only for writing is given an additional function of a thermal reading sensor by using its temperature dependent resistance. For reading purposes, the resistor is operated at a temperature that is not high enough to soften the polymer as is necessary for writing. The thermal sensing is based on the fact that the thermal conductance between the probe and the storage substrate changes when the probe is moving into an indentation, as the heat transport will be more efficient. Consequently the heater's temperature and hence its resistance will decrease. Thus, changes of the continuously heated resistor are monitored while the cantilever is scanned over a corresponding data field.

Applicant's U.S. Pat. No. 5,835,477 discloses a storage device according to Vettiger et al. with a recommendation for rewriting such a storage device. The storage device comprises a circuit for distinguishing between information which is to be erased from a first section of the storage medium and information which is not to be erased in this section. The information not to be erased is copied into another section of the storage device. Afterwards, the first section can be erased. U.S. Pat. No. 5,835,477 further suggests special guides for tracking purposes, arranged at the edges of the storage medium and interacting with mechanical guiding means of the local probe array. These mechanical means might be replaced by optical means.

With marks so densely packed, accurate scanning becomes a critical issue. Accordingly, it would be desirable having a storage device and a method for scanning a storage medium available with high accuracy in scanning and a low consumption of storage area (i.e., a high storage density) for achieving highly accurate scanning.

SUMMARY OF THE INVENTION

According to one aspect of the invention, a storage device is introduced having a storage medium for storing data in the form of marks, and having an array of probes designed for scanning the storage medium for mark detecting purposes in a scanning mode. The storage medium has fields with each field being scanned by an associated probe. At least one of the fields comprises marks representing control data, referred to herein as "operational data," for operating the scanning mode.

A mark can usually represent one of at least two different logic values, therefore representing at least a binary digit. Marks representing more logic values than two are also contemplated. Marks according to the invention are not limited to certain physical properties. Marks can be represented by topographic properties on or in the storage medium or by electrical properties or by optical properties, or even by chemical properties. Marks can for example be represented by charge trap properties in a semiconductor-oxide-dielectric structure. Or marks can have amorphous or crystalline phase properties to be detected. Marks can be arranged in the form of topographic properties in a polymer layer. The physical way of reading or writing marks is also not limited: thermomechanical reading and writing processes can be provided as well as any other processes. Thus, the storage medium and information carriers are not limited in their physical set up, except that the storage medium can be scanned by probes, a probe preferably having a tip for nanoscale scanning, hereinafter also referred to as tip shaped probe.

The storage medium is divided into fields. According to the invention, a field is defined by a collection of marks, all of them scanned by the same probe, the probe being responsible for canning its associated field. Usually the probe is exclusively responsible for scanning its associated field with no other probe being in charge of or assigned to the field, but exceptions might be allowed for special scanning operations. Likewise, a single probe can be assigned to several fields for performing scanning operations by way of exception.

Marks represent operational data in a way that in case these marks or mark patterns are scanned and read, operational data can be derived from a response signal by applying evaluation or decoding methods. This operational data gives information on how the scanning mode is to be operated or adjusted. This may, as preferred embodiments show below, —include the way probes are positioned or aligned over or on the surface of the storage medium, or the time when reading or writing pulses are to be fired, or the determination of the scanning velocity, but it is not to be so restricted. Operational data for operating the scanning mode enables the storage device to operate in a manner that stored data can be read but generally does not include information on data storage management.

The invention supports generating essential operational data that allows the storage device to perform its scanning operations with high accuracy. A small fraction of the storage medium is necessary for storing marks representing operational data. But the area overhead is maintained small by placing the operational data marks in a small number of fields, where the operational data fields usually have the same properties as all of the other data storage fields.

A major advantage is, that the same reading technique is applied to operational data marks as well as to all other data marks, so no further exceptional expenditures are necessary to obtain the operational data information. Uniform scanning of operational data marks and storage data marks is achieved.

Finally, scanning the operational data field can be performed in parallel to scanning more or even all of the fields. Through the use of probes that are capable of high throughput mark scanning, operational data can be accessed quickly and actions resulting from operational data scanning can be introduced while continuing scanning of other fields. Full parallelism is supported.

A preferred embodiment of the storage device comprises an adjusting unit for adjusting scanning parameters dependent on the operational data. The adjusting unit is designed for processing the scanned operational data and for initializing realizing steps. The adjustment of parameters does not only include the adjustment of existing parameters but also the initialization of scanning parameters.

In another preferred embodiment, the adjusting unit is designed for applying the adjusted scanning parameters to scanning operations of many or even all probe-field-units. In terms of minimizing the ratio of operational data marks to the total number of marks on the storage medium, as a first step it suffices that only one field is provided with operational data marks. The operational data are responsible for running scanning processes of all the other probe-field-units. This preferred embodiment avoids forcing every single field to store its own operational data. Appropriate mechanisms are provided for distributing control signals being derived from the operational data to the probe-field-units. For example, appropriate electrical circuits are provided to each of the probe-field-units for generating reading pulses with a frequency and/or a phase according to the operational data, so that these pulses are fired, whenever the respective probe meets a mark center.

A further embodiment of the storage device comprises a protection circuit for non-erasing or non-rewriting marks representing operational data. In contrast to non-operational data, also named storage data, which might be rewritten or erased by users of the device, operational data should be stored on the storage medium permanently, since the information operational or control carries is needed for every scanning process. At least in case non-operational data is erasable or rewritable, the protection circuit is preferably designed for inhibiting any erasing or rewriting of the operational data field or fields. The design of such a protection circuit depends on the way marks on the storage medium are generally erasable or rewritable. In case erasing or rewriting works thermomechanically, for example by applying high-current pulses to the probes to generate heat for melting parts of the storage medium, a preferred protection circuit comprises current limiting means connected to the operational data field scanning probes.

Another preferred embodiment of the storage device is suggested, where the operational data field or fields exclusively comprise marks representing operational data. Such a dedicated operational data field is very advantageous, since preferably a scanning mode is applied to scanning all or at least a majority of the fields in parallel. Thus, the operational data field is scanned from its beginning to its end simultaneously with many other fields. Consequently this preferred embodiment allows that scanning parameters can be adjusted until scanning the very last marks of each field, since the operational data field also delivers scanning operational data even with its very last marks.

In another preferred embodiment, the operational data field comprises a plurality of identical mark patterns, the identical mark patterns being sequentially aligned in a scanning direction. A certain mark pattern may contain a bundle of information on operating the scanning mode and once such a pattern is scanned, its content can be decoded and executed. Typically such a pattern does not cover the entire storage capacity of an operational data field. Consequently it is advantageous to have such a pattern stored repeatedly in an operational data field. Therefore multiple adjusting steps can be performed while scanning a field. Preferably, the adjusting steps are performed immediately after one of the operational data mark patterns is scanned and appropriate parameters are derived from it. This leads to a control loop for adjusting scanning parameters continuously while scanning a field, the adjusting steps being executed with a high frequency.

In another preferred embodiment, each of the fields has a track with a track centerline for the associated probe to follow in the scanning mode. Correspondingly, the probes are aligned in a two dimensional array. In the scanning mode each probe follows a track centerline in its associated field, provided there is no deviation. The storage device is set up in two dimensions with the ability to store data with high density.

In another preferred embodiment, each of the fields has a plurality of straight line tracks, the tracks being arranged in parallel. In contrast to circular arranged tracks on rotating storage media, this embodiment is designed for x-/y-scanning and especially for parallel x-/y-scanning of many storage fields, as the shape of the tracks determines the scanning direction and therefore the relative movement between probes and storage medium.

In another preferred embodiment, each of the tracks of the operational data field comprises an identical mark pattern. The proposed track scheme according to the above mentioned embodiment requires each probe to be lifted at the end of a track and to be put back on the following track for continued scanning. In case lifting the array of probes is not necessary, at least a cross-track movement has to be performed. With these mechanical steps being necessary for track switching, it is advantageous to adjust scanning parameters again with each track. Due to provision of identical mark patterns in each track, adjusting processes are taken for each track at the same time. This is advantageous for applying correcting terms to scanned data, especially to data scanned right before adjusting instants.

In another preferred embodiment, each of the tracks of the operational data field comprises a plurality of identical mark patterns. Multiple adjusting steps can be performed during scanning each track. This feature leads to an overall increase in the number of adjusting steps, to a minimization of error rate, and therefore to an overall increase of scanning precision and quality.

In another preferred embodiment, the adjusting unit comprises a computing unit for computing the adjusted scanning parameters based on input values delivered from the operational data scanning probe.

In a further preferred embodiment, the adjusting unit comprises an averaging unit for averaging values delivered from the operational data marks scanning probe. In case there are multiple identical mark patterns provided for the operational data field, adjustment actions can not only be taken right after having scanned one of the patterns but also after having scanned a plurality of the patterns and after having averaged the scanned values. Adjusted parameters computed on these averaged values are applied to the scanning mode afterwards. This leads to a very precise set of adjusted scanning parameters. Averaging can also include majority voting to increase error resistance. Instantaneous adjustment is maintained by taking first adjusting steps based on non-averaged values and taking further adjusting steps based on averaged values, once at least two of identical mark patterns become available.

In another preferred embodiment, the storage medium comprises at least a second field with marks representing operational data for operating the scanning mode. Due to the fact that operational data stored in the first field is responsible for the scanning mode of many or even all of the data fields, a damaged first field or a damaged probe associated to this field might inhibit scanning all of other data fields. Providing at least a second field with operational data can overcome the drawback and guarantee scanning operations even if the first field is damaged, for example due to scratches.

In another preferred embodiment, a mark pattern of the first operational data field is different from a mark pattern of the second operational data field. This feature increases access to operational data, since operational data fields can be scanned and read in parallel, so quick access to different data represented by different mark patterns placed in different operational data fields is achieved.

In another preferred embodiment, at least two operational data fields have the same mark patterns stored. The only difference is that every operational data field has these mark patterns stored in a different order. This also helps increase access to operational data, since different operational data can be accessed simultaneously due to parallel scanning of the operational data fields.

In another preferred embodiment, at least two operational data fields are arranged on the storage medium with at least one of the data storage fields in between. This feature increases probability of at least one operational data probe-field-unit not being damaged, even if another operational data probe-field-unit is damaged for example due to mechanical impact.

In another preferred embodiment, the fields of the storage medium are arranged in a two dimensional array, at least three of the fields being designed as operational data fields. These operational data fields are arranged on the storage medium with at least one storage data field being arranged in between each two of them, and where not all of the operational data fields are arranged on a straight line. This feature increases probability of at least one operating data probe-field-unit not being damaged, for example through straight line scratches or other impacts.

In another preferred embodiment, a minority of the fields comprises operational data marks and a majority of the fields is determined to store non-operational data. In order to achieve high probability of error-free operational data, redundancy of operational data fields is limited in such a way that storage capacity is still the main focus.

In another preferred embodiment, the adjusting unit has an input connected with the operational data field scanning probes. Further on, the adjusting unit comprises preferably a computing unit for computing the adjusted scanning parameters based on input values delivered from the operational data field scanning probes. Means are provided for switching between operational data fields while scanning them and computing adjusted scanning parameters, or for switching between operational data fields in case some of the fields are defective.

In a further preferred embodiment, the adjusting unit comprises an averaging unit for averaging values delivered from the operational data field scanning probes. Averaging operational data field values is advantageous for computing very precise adjusted parameters. Averaging can not only be based on multiple identical mark patterns arranged in a single operational data field, but even on identical mark patterns placed in different operational data fields. Averaging includes also majority voting to increase error resistance. Because of the possibility of parallel scanning of the identical mark patterns in different fields, adjusting parameters can be computed and conducted quickly and accurately.

In another preferred embodiment, the second operational data field comprises a different mark pattern than the first operational data field. In case an adjusted scanning parameter is calculated dependent on two input values, for example represented by a first mark pattern and a second mark pattern, the first operational data field preferably contains the first mark pattern and the second operational data field preferably contains the second mark pattern. Because of simultaneous reading of the two operational data fields when these fields are arranged on the array in the direction of parallel scanning, input values are available much faster than with scanning these patterns sequentially.

In another preferred embodiment, the operational data field comprises marks representing operational data in the form of tracking marks. Tracking marks are designed and especially placed for determining the deviation of the associated probe from a current track centerline. These tracking marks are arranged within the operational data field in such a way, that they help to identify a cross-track position of the associated tip with respect to the current track centerline. In this sense tracking marks are operational data marks that are used for aligning probes in the scanning mode in order to achieve reliable reading or writing data. Adjusted scanning parameters then comprise deviation data.

In another preferred embodiment, a servo actuator is fed with an adjusted scanning parameter for repositioning the probe on the current track centerline in case of deviation, the adjusted scanning parameter being dependent on the deviation data. Servo actuators are quick means for repositioning deviated probes back on the current track centerline. Such an actuator generally converts deviation information into control signals for a servomotor belonging to the overall driving mechanism of the storage device.

In another preferred embodiment, at least some of the tracking marks are arranged off-centered from the track centerline in a cross-track direction. This feature helps generate deviation information, since a deviated probe outputs a high-amplitude signal when scanning over one of these off-centered tracking marks.

A preferred embodiment of the storage device comprises off-centered tracking marks in each of the tracks of the operational data field. Deviation data can be generated with respect to every track and in particular with respect to every track centerline.

In another preferred embodiment, tracking marks associated to a determined track are provided with different cross-track distances between the mark centers and the respective track centerline. According to this embodiment of the invention, the magnitude of deviation can be derived precisely.

In another preferred embodiment, one or more operational data fields have virtual bursts, which are physically understood as areas comprising tracking marks that belong to different tracks of an operational data field. A tracking mark belongs to a certain burst when holding a predetermined distance between its mark center and a centerline or between its mark center and a mark center of a mark of a different burst. This kind of tracking scheme helps to support a tracking algorithm for estimating the precise position of a tip across a track. Mark centers are understood as centers of mark extensions in top view. Having a second burst in addition to a first burst of tracking marks helps to derive cross-track positions that can be uniquely decoded, as mark values of different bursts can be processed, for example subtracted from each other, to give further information on the precise position of the tip.

In another preferred embodiment, the bursts comprise a plurality of tracking marks associated to each track or track centerline. This kind of redundancy increases the reliability of the deviation information and the consequent averaging steps.

The effects of some of the following embodiments are referred to a so-called in-phase signal. The in-phase signal is derived from cross-track scanning marks of a first burst and subtracting the scanned values from values gained from cross-track scanning marks of a second burst. This vertical probe movement is only conceptual, since the actual movement of a probe is in longitudinal direction parallel to the tracks.

The in-phase signal helps getting information about the precise position of a tip. The in-phase signal has certain values along a track in a cross-track direction and therefore helps in determining a cross-track deviation, also called position error, of a probe, once a certain value is traced. A value is traced in turn by moving a possibly deviated probe along a track in the longitudinal direction—parallel to tracks—over two bursts, scanning mark values of both of the bursts, subtracting the mark values and receiving an in-phase value. With an in-phase value computed in this way, the deviation position can be determined.

In another preferred embodiment, a mark center cross-track distance between marks of two disjoint bursts is about equal to the diameter of the marks. In case the cross-track displacement is at least not less than a diameter of the marks, an in-phase signal shows constant slope, which helps identify the precise deviation easily.

In another preferred embodiment, a mark center cross-track distance between marks of two disjoint bursts is less than the diameter of the marks. In case the cross-track displacement is less than the diameter of the marks, an in-phase signal shows sections with different slope. Different slopes in the in-phase signal can be accepted provided the in-phase signal is zero-valued at track centerlines. Different slopes can also be advantageous to balance non-ideal mark topographies.

In another preferred embodiment, there are two different mark center cross-track distances between marks of two bursts. A first mark center cross-track distance has a value less than a diameter of the marks. A second mark center cross-track distance has a value equal to a track pitch (TP) minus said first mark center cross-track distance. The first mark center cross-track distance is obtained, when starting from a mark in the first burst and going to the closest mark vertically in the second burst. The second mark center cross-track distance is obtained, when starting from a mark in the second burst and going to the closest mark vertically in the first burst. This mark arrangement may cause different slopes in the in-phase signal but helps having zero values in the in-phase signal at track centerlines.

In another preferred embodiment, a mark center cross-track distance between marks of two bursts is independent from the diameter of the marks. This embodiment provides an easy way of placing tracking marks independent of their diameter on fixed positions, and only relative to the track centerlines.

In another preferred embodiment, a mark center cross-track distance between marks of two bursts is half of a track pitch. This embodiment leads to decouple the cross-track distance of marks from their diameter. This is important, since the mark diameter is basically variable and depends on parameters such as writing power.

In another preferred embodiment, the tracking marks of the two bursts have the same mark-center to track-centerline cross-track distance. Hence, they are symmetrically placed around the track centerline to achieve deviation positions that can be uniquely decoded.

In another preferred embodiment, the operational data field has a third and a fourth burst, where a cross-track distance between centers of marks of the first and the third bursts as well as a cross-track distance between centers of marks of the second and the fourth bursts is quarter of a track pitch. The above mentioned in-phase signal is often not adequate for delivering a unique position estimate. In order to make the in-phase signal uniquely decodable, there has to be provided a quadrature signal by phase shifting the in-phase signal by 90 degrees. To each value of the in-phase signal there corresponds another value of the quadrature signal, so even if the in-phase signal itself delivers in-phase values that are not uniquely decodable, the in-phase value in combination with an associated quadrature value can be decoded uniquely.

Another preferred embodiment comprises a subtracter circuit for subtracting the scanned value of a first burst mark from the scanned value of a second burst mark for computing an in-phase value. The in-phase value represents a value of the in-phase signal.

Another preferred embodiment comprises another subtracter circuit for subtracting the scanned value of a third burst mark from the scanned value of a fourth burst mark for computing a quadrature value. The quadrature value represents a value of the quadrature signal.

Another preferred embodiment comprises an evaluator for computing an adjusted scanning parameter determined by the in-phase value and the quadrature value. This adjusted scanning parameter will comprise information on the deviation or position of a probe on a track.

Another preferred embodiment of the storage device comprises a driving mechanism for moving the probes relative to the storage medium during the scanning mode. An element for mechanically linking the probes in determined and permanent distances from each other is provided for simultaneously moving the probes relative to the storage medium when applying the driving mechanism. With this embodiment, parallel scanning of all fields is achieved with minimal driving efforts. Driving mechanism might comprise two servo-motors, one for x-movements, the other one for y-movements, the latter comprising the servo actuator for tracking. X-movements and y-movements can be interchanged of course. Other suitable driving mechanisms can be applied. The linking element can be a base plate with all the probes arranged on it at determined displacements. Another embodiment of the linking element can be a common substrate of the probes.

In another preferred embodiment, the driving mechanism comprises the servo actuator, and the evaluator is designed for deriving a servo actuator control signal from the adjusted scanning parameter for adjusting the cross-track position of the probe array relative to the storage medium.

In another preferred embodiment, each probe comprises a cantilever and a tip. These probe embodiments are arranged to perform contact scanning. The cantilever has spring properties.

In another preferred embodiment, the tracking marks have basically the same shape as stored or to be stored non-operational data marks. Operational data marks as well as non-operational data marks are preferably written with the same technique and therefore have the same basic shape. This lowers efforts in providing the operational data fields with marks. A single writing technique can be applied irrespective of writing operational data marks or non-operational, conventional data marks.

In another preferred embodiment, the marks are characterized as topographic properties of a storage medium layer. Topographic marks support contact mode scanning with cantilever based probes.

In another preferred embodiment, the marks are either indentations or non-indentations in the recording layer. This embodiment supports thermowriting techniques. In thermowriting, the tip is heated while pressed on an appropriate layer of the storage medium, polymer layers are preferred storage medium, and generates an indentation when the spot under the tip melts.

In another preferred embodiment, the indentation shaped marks have approximately symmetrical conical walls in cross section. This shape is a result of above mentioned thermomechanical writing. Advantage of that kind of indentation shape is, that with sharp tips high resolution scanning can be performed. When scanning such kind of indentation marks, not only the existence of an indentation can be detected, but also the position where the tip is crossing the indentation within an indentation mark. In case the tip is positioned within a side wall of the indentation away from the center, this can be detected.

In another preferred embodiment, the tracking marks have an elongated shape in the scanning direction, preferably in contrast to non-operational data marks. For scanning purposes reading pulses can be fired at instants when the tip is positioned exactly over a mark center. When timing of pulse firing fails, the readout value will not reach its maximum value since the mark center is missed. This leads to false deviation detection. The above described shape of tracking marks is more robust to timing errors, allows a long period for firing reading pulses instead of short instants, and therefore increases quality of scanned operational data values.

In another preferred embodiment, the operational data field comprises timing marks for determining or adjusting the frequency or the phase of reading, writing or erasing pulses applied to probes in the scanning mode. Exact pulse firing instants, either for reading, writing, erasing or a combination of these operations, can be derived from the operational data field. Timing marks and tracking marks may be placed in a common operational data field. Operational data marks can supply information for timing and for tracking purposes even simultaneously. Here these kind of marks are scanned and read, and the response is evaluated both under tracking viewpoints and under timing viewpoints.

In another preferred embodiment, the operational data field comprises marks for determining a track identification. A probe, and in particular the operational data field scanning probe, can be set on a track in the respective field according to the determined track identification.

According to another aspect of the invention, a method is claimed for scanning a storage medium, comprising scanning one or more fields of the storage medium with a probe, the field comprising marks representing operational data for operating a scanning mode, simultaneously scanning additional fields of the storage medium with additional tip shaped probes, computing adjusted scanning parameters based on read operational data, and adjusting the scanning mode according to the computed parameters.

In another preferred embodiment, scanning operations of all of the fields are affected when adjusting the scanning mode.

In another preferred embodiment, computing and adjusting steps take place several times while scanning the operational data field.

In another preferred embodiment, redundant marks in the operational data field are scanned and the corresponding values are averaged, and the adjusted scanning parameters are computed based on the averaged values.

In another preferred embodiment, at least one additional field comprising marks representing operational data is simultaneously scanned by an associated tip shaped probe.

In another preferred embodiment, the operational data fields are provided with redundant marks, wherein the corresponding values of the redundant marks of different operational data fields are averaged, and wherein the adjusted scanning parameters are computed based on the averaged values.

In another preferred embodiment, different operation data fields are provided with marks representing different operational data, and the marks of different operational data fields are scanned simultaneously.

In another preferred embodiment, a probe scans its associated field along tracks with track centerlines, and cross-track deviated probes are repositioned on the associated track centerlines.

In another preferred embodiment, bursts with off-centered tracking marks are scanned, corresponding mark values of two of the bursts are subtracted to compute an in-phase value, corresponding mark values of two further of the bursts are subtracted to compute a quadrature value, and the adjusted scanning parameter is computed based on the in-phase value and the quadrature value.

In another preferred embodiment, the frequency or the phase of reading, writing or erasing pulses applied to the probes in the scanning mode is adjusted.

Advantages of the method and its embodiments go along with the advantages of the inventive apparatus and its embodiments described above.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings:

FIG. 10a illustrates a first conceptual embodiment of an array of fields according to the present invention in top view, while FIG. 10b illustrates a second conceptual embodiment of an array of fields according to the present invention in top view, and FIG. 10c illustrates a third conceptual embodiment of an array of fields according to the present invention in top view.

FIG. 11a illustrates a perspective view of a tip shaped probe, and FIG. 11b illustrates a cross sectional view of an indentation mark, written by the tip shaped probe according to FIG. 11a.

Different figures may contain identical references, representing elements with similar or uniform content.

DETAILED DESCRIPTION OF THE INVENTION

Figure 1:
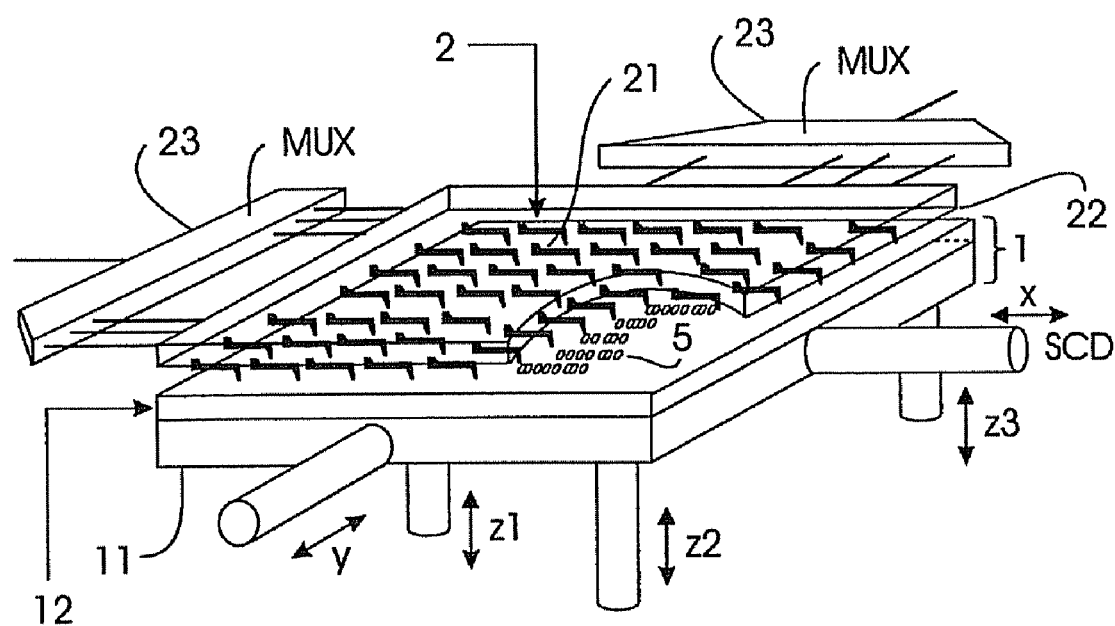
FIG. 1 illustrates a perspective view of a storage device in accordance with the present invention.

FIG. 1 shows a perspective view of a storage device in accordance with the present invention. A storage medium 1 comprising a substrate 11 and a polymer layer 12 is facing a probe array 2 having a plurality of probes 21.

Figure 11:
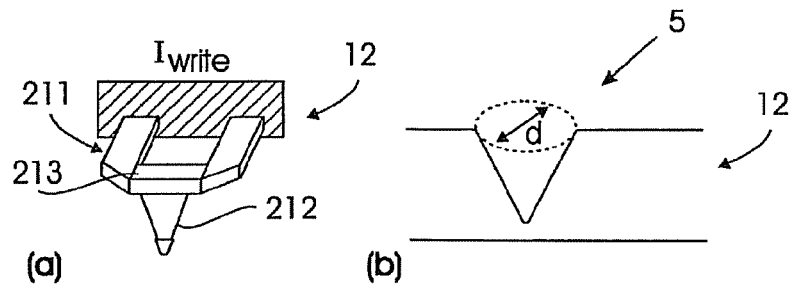

Probes 21 are mechanically linked to a linking element 22 having the shape of a plate. The linking element 22 is transparent and cut open at one edge solely for illustrative purposes. FIG. 11a shows a perspective view of a single probe 21. The probe 21 comprises a spring cantilever 211 with a tip 212 at its end. The cantilever 211 is sensitive to vertical forces. The probe 21 further comprises a heater platform 213 between legs of the cantilever 211 and the tip 212.

Writing in the storage device is performed using a thermomechanical technique. A local force is applied to the polymer layer 12 by the probe 21. Polymer layer 12 is softened by heating the heater platform 213 with a current or voltage pulse during contact mode, so that the polymer layer 12 is softened locally where the tip 212 touches the polymer layer 12. The result is a small indentation mark 5 in the polymer layer 12 according to FIG. 11b, having nanoscale diameter d.

In order to read data, the polymer layer 12 is moved under the probe array 2 at a constant velocity. The scanning velocity and the distance between marks determine the data rate of the system in marks/bits read or written per second. Reading is also accomplished with a thermomechanical concept. The heater cantilever 211 used for writing is given the additional function of a thermal reading sensor by exploiting its temperature dependent resistance. For reading purposes, the resistor is operated at a temperature, that is not high enough to soften the polymer layer 12 as is necessary for writing. For reasons of power conservation, periodic current or voltage pulses of short duration are applied to the cantilevers in order to heat the cantilever to the appropriate temperature for reading purposes, rather than a DC current or DC voltage. This pulsed reading signal determines operating temperature at the cantilevers for data readout. Data detection is performed by monitoring the changes in the current signal across the heated cantilever as it scans over tracks. The thermal sensing is based on the fact that the thermal conductance between the probe 21 and the storage medium 1 changes when the probe 21 is moving into an indentation mark 5, as the heat transport will be more efficient. The probe's temperature drops due to more efficient heat transport through air, as the cantilever tip moves into a polymer indentation mark 5 where the distance between heater and polymer is reduced. Since indentation marks 5 do not usually have vertical walls in practice, they are modeled as conical indentations of the storage medium 1—see FIG. 11b. During motion of the tip 212, the temperature change of a heated cantilever 211 is gradual as it moves from a mark edge down towards its center, where the mark depth is maximum. Consequently the heater platform's temperature and hence its resistance will decrease. Thus, changes of the heated resistor are monitored while the cantilever 211 is scanned over data marks.

Solely for purposes of illustration, marks 5 are shown only in a confined area of the storage medium 1 back in FIG. 1.

The probes 21 are scanning the entire storage medium 1 either by moving the probe array 2 relatively to the storage medium 1 or vice versa. In FIG. 1 the storage medium 1 is moved while the probe array is fixed in its position. Arrows x and y indicate the scanning direction, while z arrows indicate an approaching and leveling scheme in vertical direction for bringing the entire probe array 2 into contact with the storage medium 1.

The storage medium 1 is divided into fields, not explicitly shown in FIG. 1. Each probe 21 of the array 2 scans (e.g., writes or reads) only in its own data field. Consequently, a storage device with, for example, 32×32 probes will comprise 32×32=1024 fields.

At least one of these fields, while not shown explicitly in FIG. 1 but shown in the following FIG. 2 and FIG. 3 with the reference 42, comprises operational data, used by the storage device for running the scanning mode in an appropriate way. Such operational data may be data for obtaining timing information for scanning purposes: For reasons of power conservation, periodic pulses of short duration rather than a DC voltage are applied to the cantilevers 211 while scanning the storage medium 1. During normal operation, one such pulse is fired every T seconds—corresponding to the horizontal distance between neighboring marks 5. The duration of the pulse is small compared to the time it takes to move in and out of the mark 5. Therefore it is advantageous to derive timing information from the operational data field. Other operational data may be tracking data described in detail below.

The operational data field is preferably prewritten by the device manufacturer, whereas the other data fields are not prewritten with data when the storage device has rewritable properties, but are prewritten with data when the storage device is read only.

The storage device is preferably operated with row and burst time-multiplexing addressing, schematically shown by multiplexers 32. The storage device according to FIG. 1 is ready for parallel scanning of all fields. Storage fields might also be scanned row by row or burst by burst. Every movement of a single probe 21 is applied to all the other probes 21 due to mechanical coupling of the probes 21.

Figure 2:
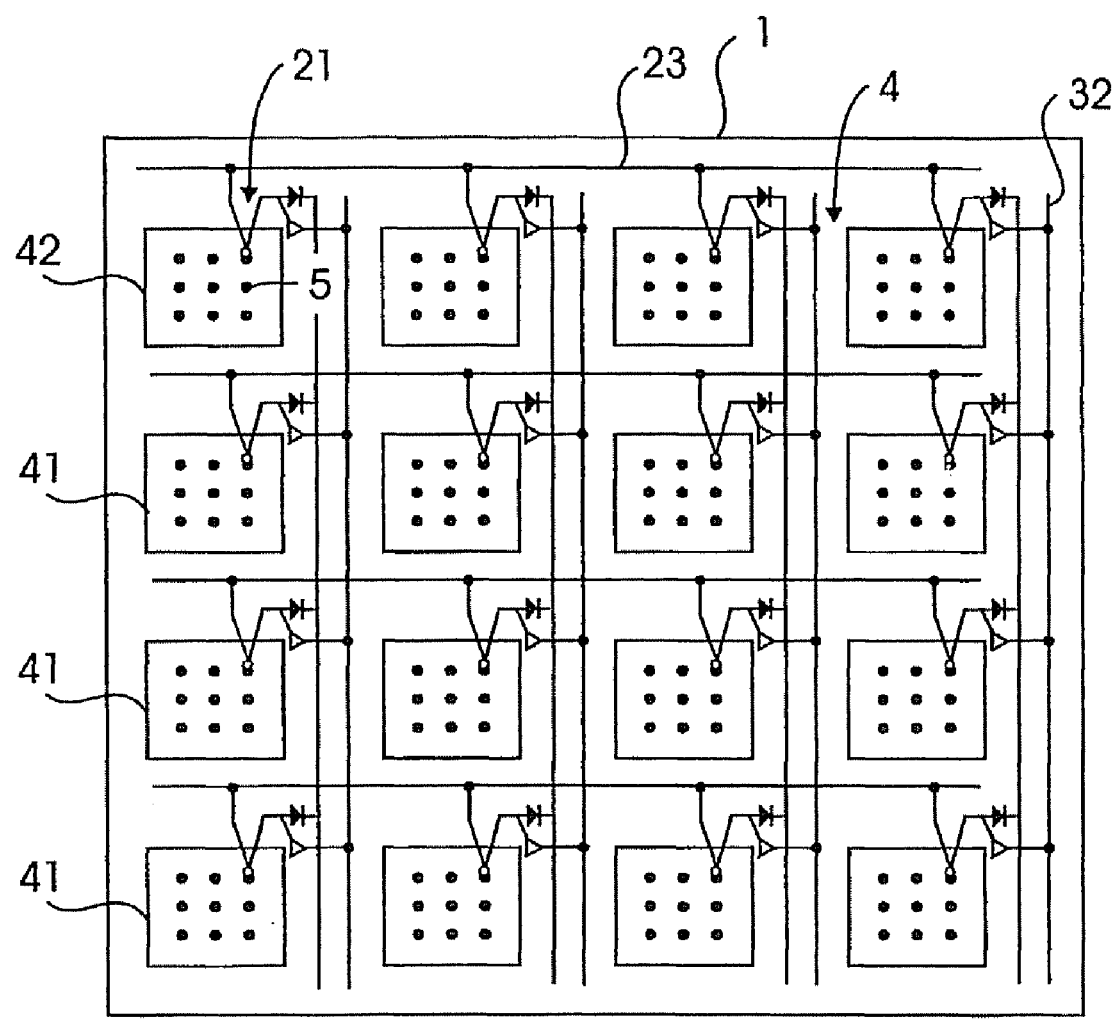
FIG. 2 illustrates a top view of a storing medium with a symbolic probe array in accordance with the present invention.

FIG. 2 presents a symbolic top view of a storage medium 1 with four times four fields 4 arranged in rows and bursts. Each field comprises marks 5. There are symbolic nine marks 5 disclosed within each field 4. This amount is of course not of true nature but only symbolic, as it is desirable for these kind of storage devices to pack as much data marks on the storage medium 1 as possible. All of the depicted fields 4 are data storage fields 41, except the field 42 in the upper left corner containing exclusively operational data for running the storage device. The fields are bordered in order to make them visible. Such borders in forms of grooves might also be placed on the storage medium 1 for defining the beginning and the end of a field 41, 42, but not necessarily are. Rather, fields are defined by the extent of marks 5 a single probe 21 is responsible for scanning.

In addition, only a few of symbolic tip shaped probes 21 are shown in a scanning position touching every one of fields 41 and 42. The probes 21 are electrically connected with a time multiplexer 32, represented symbolically with common wires in FIG. 2.

Operational data field 42 might also have a wider geometry than data storage fields 41, to allow scanner turn around and re-centering the associated probe 21 on the desired track.

Figure 3:
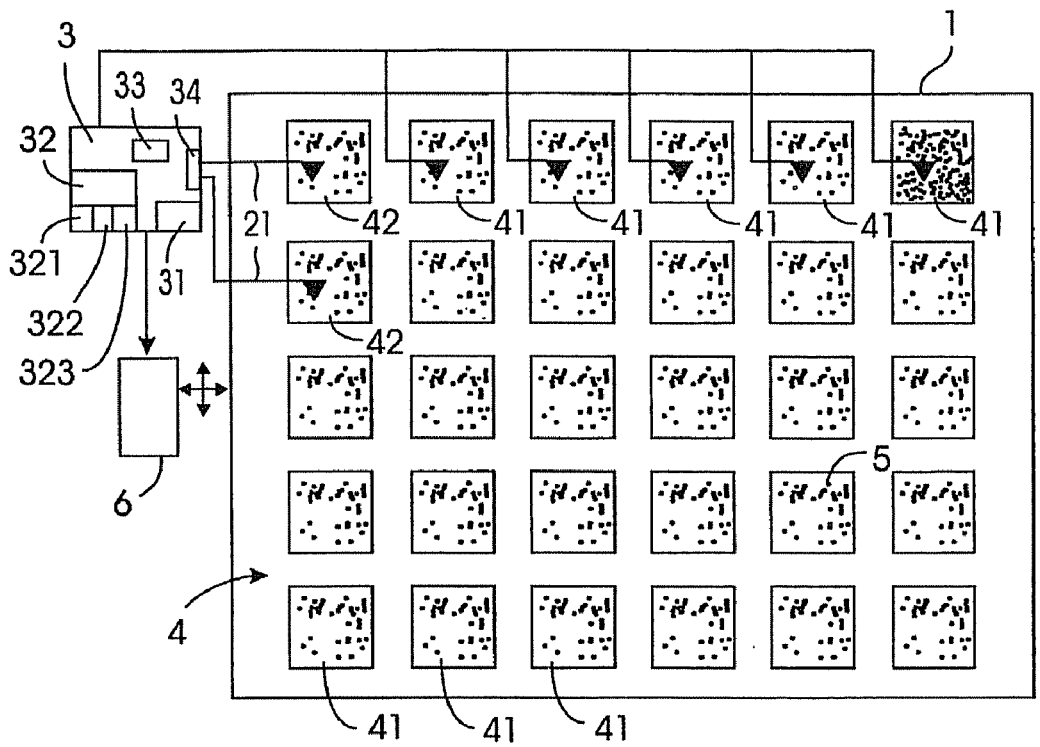
FIG. 3 illustrates the top view of another embodiment of a storage medium with a symbolic probe array in accordance with the present invention.

FIG. 3 shows another symbolic top view of a storage medium 1 with six times five fields 4 arranged in rows and bursts. Each field 4 comprises marks 5, symbolically drawn as spots. All of the fields are data fields 41, except the field 42 in the upper left corner and the field below it, both of these fields containing exclusively operational data for running the storage device.

Only some of the probes 21 are symbolically shown for clarity in the drawing. FIG. 3 presents an adjusting unit 3 with several elements: input 34, protection circuit 31, averaging unit 33 and computing unit 32, the latter comprising a first subtractor unit 321, a second subtracter unit 322 and an evaluator 323. These sub-units are explained more detailed below with respect to further drawings. The adjusting unit 3 is connected to a driving mechanism 6 of the storage device for moving the probe array 2 relatively to the storage medium 1.

The adjusting unit 3 might be a microcomputer with associated software programs, or hardware, or be embodied partly as hardwire logic and partly as software. The averaging unit 33 can be part of the computing unit 32 or vice versa. In this context, the term unit is not understood as a physical unit but as a function that might have a physical correspondence but not need to have.

The adjusting unit 3 is designed to receive scanned operational data. The direct physical link of the input 34 to both of the operational data field scanning probes 21 is a symbolic link rather than a physical two wire link and can also be achieved by multiplexing or other techniques. The adjustment unit 3 in general is designed to process the received operational data and output parameters having impact on the scanning mode of many or all the probe-field units. These adjusted scanning parameters can have impact on the driving mechanism 6 or the way the probes 21 are scanning, symbolized with lines connecting the adjustment unit 3 with the probes 21 and the driving mechanism 6.

Figure 4:
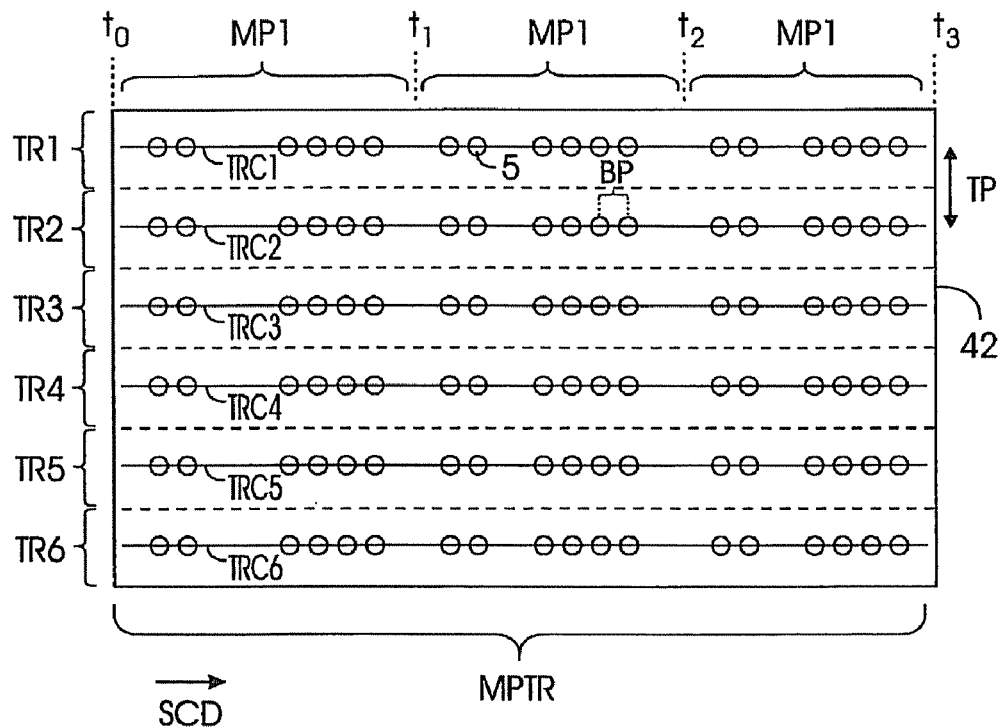
FIG. 4 illustrates a top view of an operational data field according to the present invention.

FIG. 4 shows a top view of an exemplary operational data field 42 according to the present invention. The operational data field 42 comprises several tracks TR1 . . . TR6. Track centerlines TRC1 . . . TRC6 mark the middle of each track TR and represent the way the associated tip is moving during scanning mode, see also scanning direction SCD with its corresponding arrow. Along the track centerlines TRC1 . . . TRC6, there are marks 5 representing operational data. Each mark is centered on its track centerline, so a centered tip shaped probe can detect the marks 5. Presence of a mark indentation corresponds to a logical 1 and the absence of it to a logical 0. All indentations, also called pits, are nominally of equal depths and sizes, and are placed at a fixed horizontal distance from each other along a track TR. The horizontal distance between mark centers is called bit pitch BP. The vertical track extension, and accordingly the vertical distance between adjacent track centerlines, is called track pitch TP.

Marks 5 in FIG. 4 have physical properties of indentations, depicted as circles, and non-indentations, not depicted, but still "alive", e.g. in between the two and the four marks alignment. As can easily be derived from FIG. 4, a certain amount of marks 5 represent a mark pattern MP1, that is repeated three times on each track TR. Assuming this mark pattern MP1 helps determining a permanently shifting scanning parameter like reading or writing frequency, this frequency can be adjusted three times at instants t1, t2 and t3. Every time a mark pattern MP1 for determining the correct frequency is scanned completely, correcting or adjusting control or operational parameters are computed. This affects scanning frequency of all data fields, as scanning of all the fields is preferably performed in parallel and adjusted parameters are distributed to all probes, or at least most of the probes are affected by an adjusted parameter.

Since a field is usually scanned track by track, it is advantageous to provide identical mark patterns for every track.

Therefore the triple mark pattern MP1, which builds mark pattern MPTR, is provided for every track.

FIG. 5 to FIG. 9, inclusive, deal with operational data used for tracking. It is desirable to know the deviation, synonymous to position, of a probe from its ideal position on a track, preferably its track centerline, in order to reposition the probe to its ideal position. Otherwise scanned data might contain errors.

Figure 5:
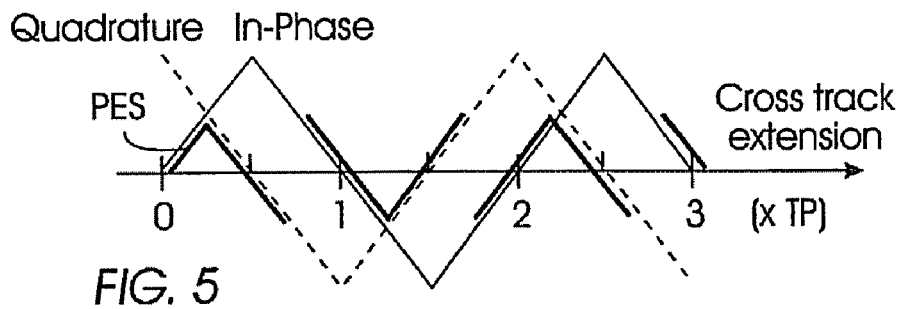
FIG. 5 illustrates an in-phase and a quadrature signal over a cross-track extension.

For purposes of illustration, FIG. 5 shows an ideal in-phase signal as well as a quadrature signal over cross-track extension. The numbers on the horizontal axis correspond to numbers of track centerlines, spaced apart with track pitch TP.

The in-phase signal helps getting information about the precise position of a tip and its cross-track deviation from track centerlines: The in-phase signal has certain values along a track in cross-track direction. When operating the storage device, a displacement of the probe can be detected through well-placed tracking marks. When riding over these marks, the probe delivers a signal with a certain amplitude. The value of this amplitude can be decoded into a deviation or position according to the in-phase signal.

An ideal in-phase signal like the one shown in FIG. 5 has unique values over one track width in cross-track direction. Hence, every single value of the ideal in-phase signal stands for a unique deviation value within a certain track. The ideal in-phase signal is zero at track centerlines and is linear across a cross-track length corresponding to one track pitch TP (plus and minus one half of a track pitch around each track center). Therefore, each cross-track position error is uniquely mapped within a track pitch to a deviation value. Constant signal slope within a track and the zero-values at track centerlines supports quick and easy decoding of the deviation.

Unfortunately, it is difficult to provide a tracking structure on the storage medium that delivers uniquely decodable values along an in-phase signal. With applying one aspect of the invention to use marks not being different from data marks as tracking marks, building a uniquely decodable tracking structure depends on mark diameter and track pitch.

Even with having a tracking structure close to providing an ideal in-phase signal, sometimes a flattening of the in-phase signal around track borderlines occurs, especially around its minimum and maximum values. This phenomenon leads to non-unique decodable values of the in-phase signal. To ensure unique deviation decoding at these positions a quadrature signal is generated in addition to the in-phase signal, see FIG. 5, dotted line. This quadrature signal is a 90 degrees phase shifted version of the in-phase signal. The quadrature signal has zero-crossings at track borderlines. The quadrature signal helps in removing the deviation ambiguity of the in-phase signal. This is achieved by using the in-phase signal around track centerlines, and the quadrature signal elsewhere. In order to know which signal is to actually use, both the in-signal value and the quadrature value have to be evaluated. The resultant signal, also called position error signal PES, is shown in thick solid lines in FIG. 5. It is piece-wise linear, with constant absolute slope at all cross-track positions.

Figure 6:
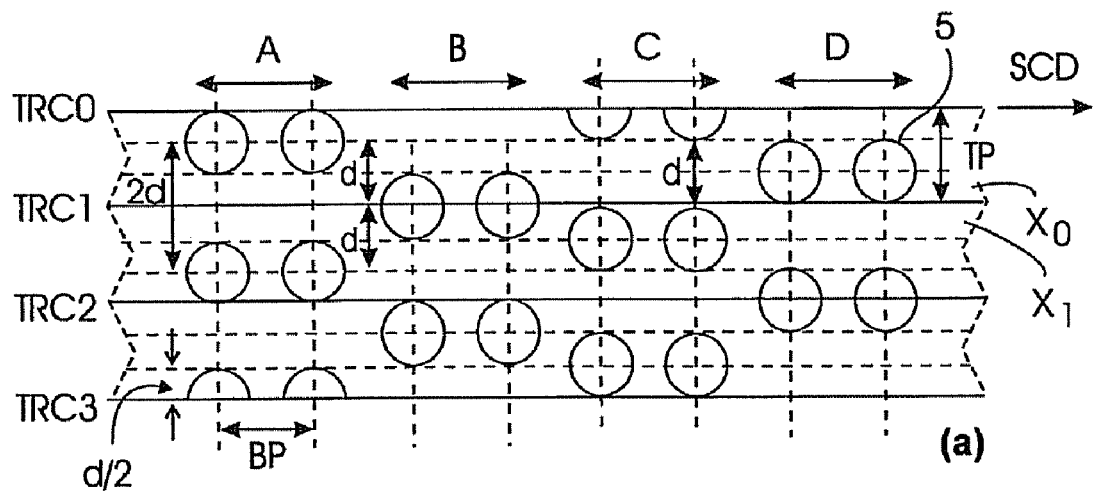
FIG. 6a illustrates a section of a first tracking pattern of an operational data field according to the present invention in top view.
FIG. 6b illustrates the corresponding in-phase and quadrature signals.
Figure 6:
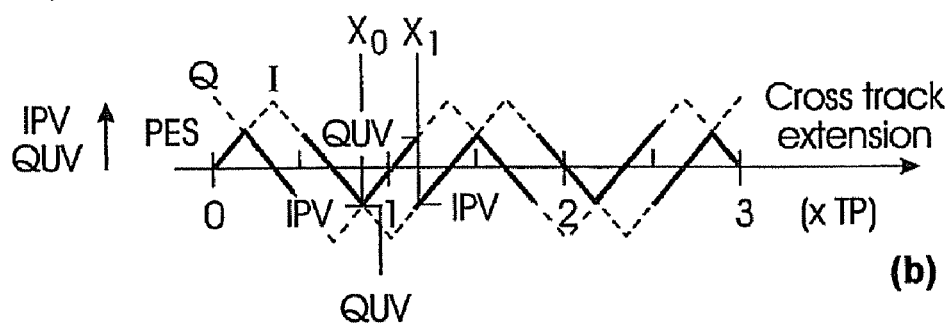
Figure 7:
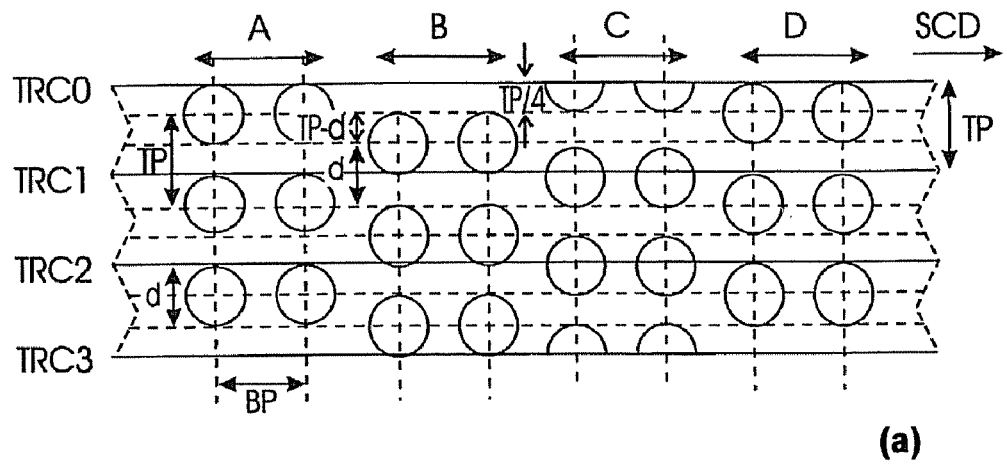
FIG. 7a illustrates a section of a second tracking pattern of an operational data field according to the present invention in top view.
FIG. 7b illustrates the corresponding in-phase and quadrature signals.
Figure 7:
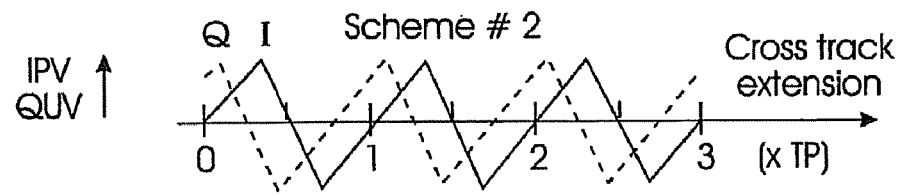
Figure 8:
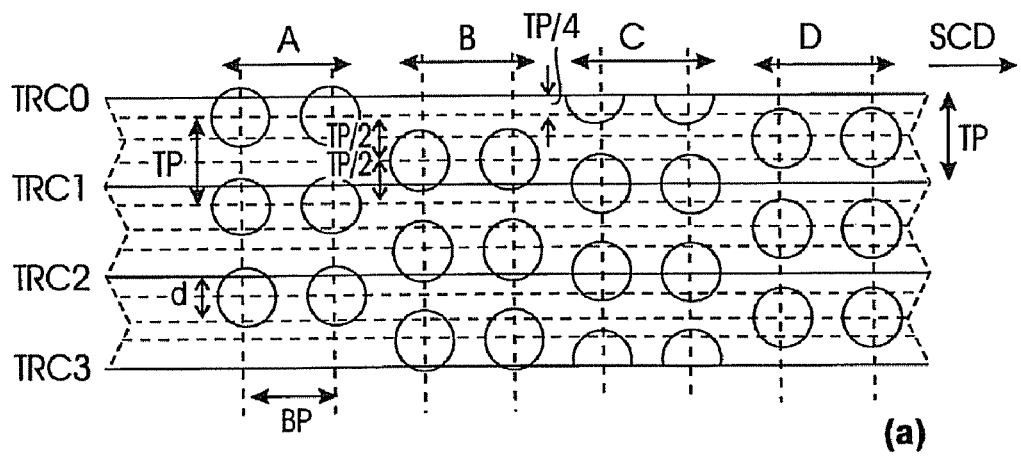
FIG. 8a illustrates a section of a third tracking pattern of an operational data field according to the present invention in top view.
FIG. 8b illustrates the corresponding in-phase and quadrature signals.
Figure 8:
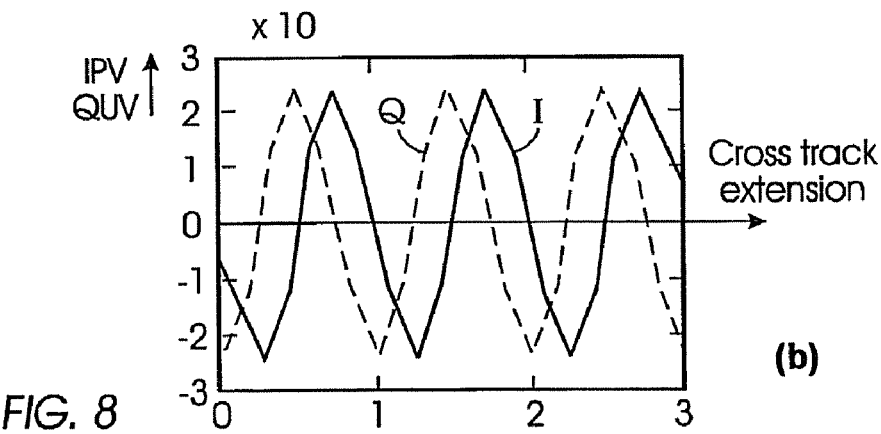

FIG. 6 shows a first approach to a tracking mark pattern. FIG. 6a shows a section of a first tracking pattern of an operational data field according to the present invention in top view. FIG. 6b shows corresponding in-phase and a quadrature signals over cross-track extension. FIG. 7 and FIG. 8 show further embodiments of tracking mark patterns. Scanning direction SCD is indicated.

In FIGS. 6a, 7a and 8a, the solid horizontal lines depict track centerlines TRC while tracking marks 5 are modeled as perfect conical indentations of the polymer storage surface and have circular form due to the top view. Each of these figures present four track centerlines TRC with numbers zero to three with a track pitch TP=3d/2. Parameter d is the diameter of a single mark 5. There are four bursts A, B, C and D shown in every figure. Tracking marks 5 are placed in bursts A and B for building the in-phase signal, and other tracking marks 5 placed in bursts C and D for building the quadrature signal.

Referring to the embodiment according to FIG. 6a, the centers of tracking marks in burst B are vertically offset by an amount equal to the mark diameter d from mark centers in burst A, an arrow is indicating the cross-track mark-center distance. This vertical offset is always understood as a cross-track distance between mark centers of marks belonging to different bursts. The aforementioned distance between marks in bursts A and B assures no vertical overlap between marks in the two bursts A and B. The same principle applies to marks in bursts C and D, with the additional condition the mark centers in burst C are offset by d/2 from mark centers in burst A in cross-track direction. This relationship is valid for marks of bursts D and B too. The latter condition is required to generate the corresponding quadrature signal.

In order to illustrate generation of in-phase and quadrature signals, it is assumed that a tip shaped probe is located on track centerline number zero and moves vertically down towards tracking centerline number three in a line which crosses the centers of marks in burst A (dotted line). The tip moves from the edge of the top mark towards its center, then towards its bottom edge, then to blank space, then again to a mark and so on. The response signal magnitude decreases linearly with the distance from the mark center and is zero or equal to a constant outside a mark according to the adopted conical shape of a mark.

This and the following disclosed vertical probe movements are only high level and illustrative, since the actual movement of the probe is in the longitudinal direction parallel to the tracks. Vertical movement is used in order to illustrate the generation of in-phase and quadrature signals and possibly resultant position error signals, that is the curve arising by joining all deviation or position error values, each value corresponding to a certain deviated cross-track position of the probe.

To generate the in-phase signal, the tip is then moved over burst B and the readout signal is measured in a vertical line crossing the mark centers of burst B (dotted line). The in-phase signal is then generated as a difference A minus B, where A and B stand for the demodulated signal values of vertically scanned bursts A and B. This in-phase signal is represented by a line labeled I in FIG. 6b. The in-phase signal has zero-crossings at multiples of d, which do not generally correspond to track centerlines since TP=3d/2. Therefore, the in-phase signal is not uniquely decodable in itself.

This is where the quadrature signal becomes necessary. The quadrature signal is generated from scanning the marks of bursts C and D in the way described above with respect to bursts A and B, with burst C replacing burst A and burst D replacing burst B. The quadrature signal is generated from vertically scanning marks of bursts C and D and subtracting values of burst D from values of burst C. The result is shown in FIG. 6b as quadrature signal Q, the quadrature signal Q being a phase shifted version of the in-phase signal by 90 degrees. The quadrature signal exhibits zero-crossings at points, where the in-phase signal I has local extrema.

Consider the case where a possibly deviated probe moves along a track in longitudinal or scanning direction SCD. Mark values of both of the bursts A and B are scanned. These mark values are subtracted by an subtracter circuit 321 according to FIG. 3, which outputs an in-phase value IPV. For example, track one is scanned in FIG. 6a, the probe is slightly deviated, and the in-phase value IPV delivered from subtracter circuit 321 having an exemplary value shown in FIG. 6b. This in-phase value IPV might have two correspondences on the in-phase signal of track one in FIG. 6b: the scanned and computed in-phase value IPV might stand for a deviation x0 or for a deviation x1, which is the same absolute deviation value but in different directions from track centerline number one. The measured in-phase value IPV is thus not uniquely decodable. But to each value of the in-phase signal, another value of the quadrature signal is assigned, a position of the probe can uniquely be determined by looking at the in-phase value and the corresponding quadrature value.

To gain the corresponding quadrature value QUV, mark values of both of the bursts C and D are scanned with the slightly deviated probe in scanning direction SCD. These mark values are subtracted by a second subtracter circuit 322 according to FIG. 3, which outputs the quadrature value QUV.

In case the probe is deviated to position 0, the quadrature value QUV would have negative polarity according to FIG. 6b. In case the probe is deviated to position x1, the quadrature value QUV would have positive polarity according to FIG. 6b. This evaluation is done by the evaluator 323 according to FIG. 3. The evaluator 323 determines, which one of the possible deviations x0 or x1 is the correct one. In this example, position x0 is identified, the corresponding position in cross-track extension is used for adjusted scanning parameter. The servo actuator is fed with this parameter to set the probe back on track centerline with x0 units.

This evaluation method also can be represented with a signal called position error signal PES, which is a combination of the in-phase signal and the quadrature signal. A piecewise combination of the I- and Q-signals results in the PES signal, shown with solid lines in FIG. 6b. The PES signal has zero-crossings at all track centerlines and constant absolute slope, which qualifies it as a valid PES signal. However, this PES signal exhibits zero-crossings at all multiples of d/2. For the present embodiment with track pitch TP=3d/2, three such zero-crossings exist within an area of track width TP around each track centerline. This fact however, does not hamper unique deviation decoding: At even-numbered tracks, it is the zero of the in-phase signal I that signifies the track center. The zeros of the quadrature signal Q in turn can be uniquely mapped into a position estimate by looking at the polarity of the corresponding in-phase values. This is a very easy decoding algorithm. This holds for any value of the combined PES signal within the area around the track centerlines TRC. The signals and values change role for odd numbered tracks. The track number, which is known beforehand from the scanning operation is used to determine the mode of operation for the deviation demodulation procedure given the PES value at hand.

Although each burst typically consists of many horizontally displaced marks with the same cross-track deviation from the corresponding track centerline TRC to enable averaging of the corresponding readout signals, only two marks per burst are shown in FIGS. 6 to 8, to simplify illustration.

A further embodiment of a tracking mark pattern is shown in FIG. 7a with the corresponding in-phase and quadrature signals I and Q over cross-track extension in FIG. 7b. Track pitch TP is 3d/2 again. The marks in each burst are now placed TP units apart vertically, while marks in bursts A, B and C, D overlap each other in the cross-track direction. The vertical distance between mark centers in burst A (C) and mark centers in burst B (D) is alternating between TP-d and d as shown in FIG. 7a, giving rise to asymmetric in-phase and quadrature signals. The idea is to generate an in-phase signal I with zero-crossing at each track centerline TRC. However, unwanted zero-crossings are also generated midway through each track. A quadrature signal Q is needed to resolve ambiguity. Since the quadrature signal Q has a phase difference of 2 PI radians from the in-phase signal I by definition, mark centers in burst C must be offset by TP/4 units from mark centers in burst A in the cross-track direction.

Although the in-phase signal I is piecewise linear in FIG. 7b, it exhibits an asymmetry around its extrema, which arises from the asymmetrical vertical placement of marks in bursts A and B. As a result, zero-crossings of the in-phase signal I do not align with extrema of the quadrature signal Q and vice versa. This leads to higher expenditures in decoding but gives unique deviation values over tracks in cross-track direction.

A further embodiment of a tracking mark pattern is shown in FIG. 8a with the corresponding in-phase and quadrature signals I and Q over cross-track extension in FIG. 8b. Track pitch TP is 3d/2 again.

Similar to the tracking mark pattern of FIG. 7, the generated PES signal of FIG. 8b has zero-crossings at track centerlines and halfway between. However, unwanted zero-crossings are easily resolved through the quadrature signal Q, which now has minima at track centerlines and maxima halfway between, or vice versa. The alignment of the extrema of the one signal with the zeros of the other signal is achieved by placing the mark centers in bursts A and B—and also in bursts C and D—at equal vertical distances from each other. The distance between mark centers of the same burst is equal to TP, while the distance between mark centers in bursts A and B—and also in bursts C and D—is TP/2. The vertical distance between A and C burst marks is TP/4.

Although the PES signal according to FIG. 8b is not linear throughout half of its period, it is uniquely decodable at all points through the use of both I and Q signals.

An interesting property of the mark pattern according to FIG. 8a is, that it decouples the vertical distance of marks from the mark diameter d. This is advantageous, since the mark diameter d is variable and depends on parameters such as writing power. In practice it has been found, that marks are not perfect conical indentations of the polymer medium but instead exhibit rings around the indentation. This means that the diameter of the indentation is smaller than the mark diameter. Position error demodulation however is based on the principle that the readout signal reduces in magnitude away from the mark center and reaches a background level at a distance equal to d from the center. If the indentation diameter is reduced, the effective range for position error demodulation also reduces. In order to ensure unique decoding and avoid multiple zero-crossings, one has to bring the marks of A and B bursts as well as marks of C and D bursts vertically closer, so that they overlap in the cross-track direction. Mark pattern according to FIG. 8a offers this flexibility, while also maintaining unique decoding.

One feature that has all the proposed tracking mark patterns in common is, that they are all easy to fabricate: Writing of the tracking field can be done by the probe itself. Self-writing is significantly cheaper and faster than, for example etching tracking marks which would involve lithographical steps.

Reading data fields is performed the same way as reading operational data fields. Therefore, an operational data field resembles a field provided for conventional data, the only difference being the off-centered placement of the tracking marks.

A further advantage is that tracking demodulation is almost identical to data readout. Specifically a pulse of short duration is fired when the cantilever tip crosses a mark center. This means that any cantilever can be used for position error generation, thus simplifying the design of the system electronics.

Figure 9:
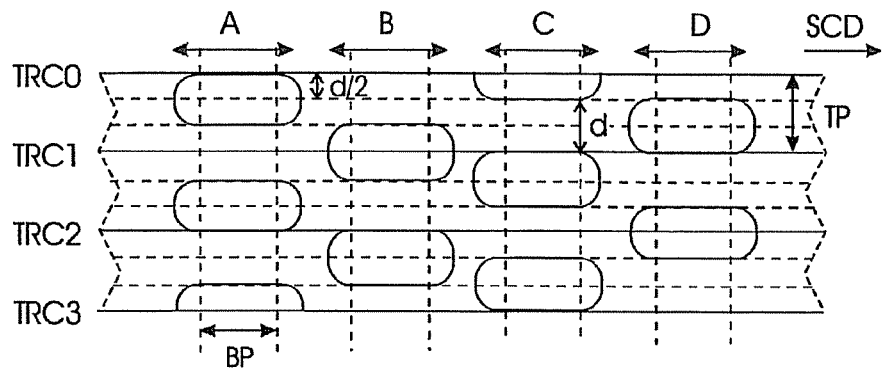
FIG. 9 illustrates another embodiment of the first tracking pattern according to FIG. 6a in top view.

FIG. 9 shows a further embodiment of a tracking pattern within an operational data field with focus on the shape of marks. The mark pattern itself is similar to the mark pattern shown in FIG. 6a in terms of relative vertical placement of the operational features in different bursts. Scanning of marks belonging to the preceding patterns is sensitive to timing errors, since the read pulses have to be fired at instances, where the tip of the probe meets exactly the mark center. Thus, even when the tip is positioned exactly on the track centerline, the read out amplitude will not reach its maximum value, whenever the mark center is missed with the firing pulse. This leads to loss of amplitude for the demodulated deviation values at its local extrema and to flattening around its zero-crossings.

In order to increase robustness to timing variations marks are preferably elongated, that is, made longer in the direction parallel to the tracks and therefore in scanning direction SCD. In the limit, the gaps between indentation marks within a burst according to the preceding mark patterns are 'filled', thus creating only one fat mark per burst which covers the entire track length per burst previously occupied by a number of marks. These elongated marks are then trenches, or grooves, along a specified length of the track. So the pattern according to FIG. 6a, is modified with elongated tracking marks according to FIG. 9. The positioning parameters of the pattern do not change. The robustness to timing variations is essential, as generation of deviation values will not be affected, but the indentation of the polymer along the cross-track direction is now continuously present longitudinally.

The advantages of the tracking burst configurations according to the detailed description of the previous figures carry over to elongated tracking marks. Self-writing of tracking information is still feasible, while deviation demodulation is identical to conventional tracking marks. The only slight difference between tracking mark spots and elongated tracking marks is that the latter may require higher power for writing. However, since tracking information is only written once, this issue tends to be of minimal importance.

Operational data field placement is a subject of careful consideration. For the following discussion it is assumed that the scanning mode has parallel access to multiple fields along one dimension of the field array. Scanning is, for example, performed row by row. By placing a number of operational data fields along the parallel-accessed dimension, here the row of the array, either deviation values can instantaneously be generated, or several samples of a tracking burst can be sampled at once. For example it is assumed, that four operational data fields are placed in some row of the field array. One preferred embodiment is, that with regard to tracking, only marks of one burst according the preceding description are written in each of the operational data fields: So the first operational data field contains only marks of burst A, the second operational data field contains only marks of burst B, and so on. Then each time, the row is read in parallel, one sample of each burst is obtained simultaneously, so that a deviation value can be computed. In another embodiment, all four operational data fields are similar, containing marks of all four bursts A, B, C, D. During readout, four samples of the same burst are obtained at once, enabling averaging computations.

This first embodiment is advantageous in terms of frequency of generating deviation values and therefore frequency of adjusting scanning, which is important in situations where scanner positions drift fast, causing tracking errors. The second embodiment leads to reliable deviation values and adjusted scanning parameters, but requires more time in order to generate these parameters. The choice of one of these embodiments or some combination of them depends on the characteristics of the system, the nature and severity of disturbances, and the scanner movement among other factors.

Redundancy basically means repeating the same information in several spatially disjoint areas of the storage medium in order to increase robustness to disturbances. Different advantageous redundancy patterns has already been introduced. Marks representing operational data can be repeated within a burst in a fine level to enable averaging out the effects of random disturbances and noise. In the coarse level, entire tracking mark areas are duplicated in different fields of the array and therefore in different areas of the storage medium. Thus, position error information can be generated at a sufficient frequency and once a operational data field or at least a burst is destroyed due to scratches, media defects or other media-dependent imperfections, scanning information can be derived from another source, for example another operational data field.

Figure 10:
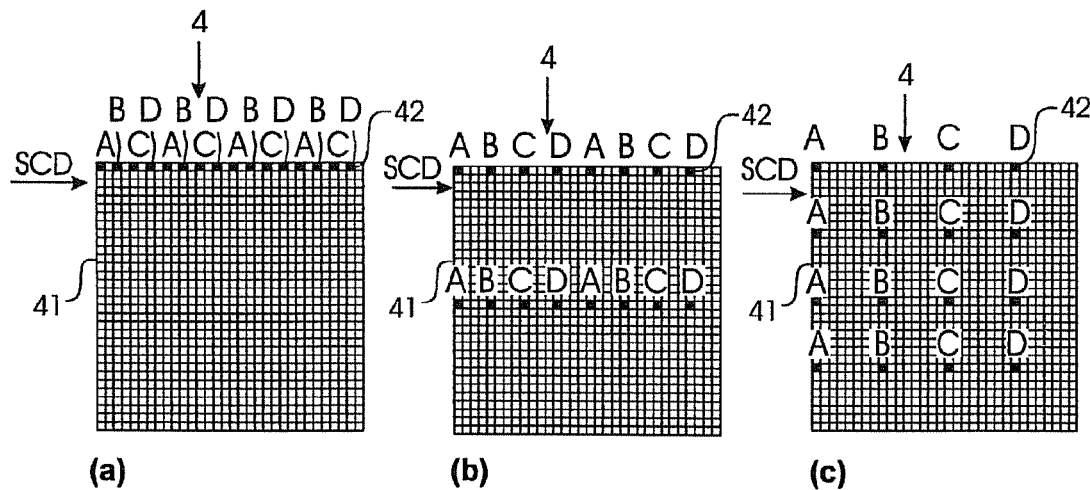

FIG. 10 deals with operational data field placement on a storage medium and shows three top views of an array of fields 4 divided into 32×32 fields. Each square within the storage medium 1 represents a field. Unshaded squares represent storage data fields 41. Shaded squares represent operational data fields 42. Three preferred operational data field configurations are introduced, with sixteen operational data fields 42 within every array of fields 4. The number of operational data fields 42 is assigned as overhead. Scanning direction SCD within every field is indicated by an arrow.

In the first topology according to FIG. 10a, all sixteen operational data fields 42 are placed in the first row of the two-dimensional field array 4, given the fixed overhead budget of sixteen operational data fields. All the operational data fields 42 are covered with tracking marks.

Since all fields of a row are accessed in parallel, provided row-wise multiplexing is applied, it is advantageous to write only marks of one of the above introduced bursts in each operational data field 42. For example, the first four operational data fields 42 contain only A burst marks, the next four have B burst marks, and so on, with other arrangements possible, such as A-B-C-D-A-B-C-D-A . . . . This scheme will generate four deviation values at one read access. These values can be subject to averaging. In this context all marks of a burst A, B, C, or D can be regarded as a mark pattern, so that at least four operational data fields contain different mark patterns.

Applying row-wise multiplexing, each first mark of each first row field is read first, then each first mark of each second row field is read, and so on, until each first mark of each last row field in is read. Thereafter, each second mark of each first row field is read, then each second mark of each second row field is read, and so on. Due to the constant movement between the storage medium and the probe array, the first marks of each field in common field columns are shifted with respect to each other in scanning direction to permit multiplexing access and maintaining constant movement. However, it will take Ts seconds between reading the first marks of the first row fields and reading the second marks of the first row fields with Ts being the time for covering the distance between the centers of the first marks and the centers of the second marks. Within these Ts seconds all the first marks of all other row fields except the first row fields are read. Ts denotes the time until the next deviation values are generated. Therefore a deviation value is available every Ts seconds.

According to the topology of FIG. 10b, averaging is traded off for frequency of occurrence. Now two position error values are formed at one access—provided an arrangement of two A, two B, two C and two D mark patterns over the eight first row operational fields, but two more follow after Ts/2 seconds due to the placement of operational data fields in a middle row of the storage medium—provided an arrangement of two A, two B, two C and two D mark patterns over the eight middle row operational fields. This enables tracking of fast position variations According to FIG. 10.c, this topology offers a maximum frequency of tracking information occurrence, with one deviation value generated every Ts/4 seconds according to placement of operational data fields in every eighth row of the storage medium.

Other topologies and/or combinations thereto can be conceived within the scope of the invention. While our invention has been described with respect to certain preferred embodiments and exemplifications, it is not intended to limit the scope of the invention thereby, but solely by the claims appended hereto.

What is claimed is:

1. A storage device, comprising:
   a storage medium for storing data in the form of marks;
   an array of probes designed for scanning said storage medium for mark detecting purposes in a scanning mode;
   wherein said storage medium has fields with each field adapted to be scanned by an association probe, each of said fields has a plurality of tracks and each of said tracks has a track centerline for the associated probe to follow in said scanning mode;
   wherein at least one of said fields comprises marks representing operational data for operating said scanning mode wherein at least one operational data field comprises tracking marks for determining the deviation of the associated probe form a current track centerline, at least some of said tracking marks arranged off-centered from said track centerline in a cross-track direction and at least one operational data field comprises first and second bursts where a tracking mark is associated to a burst when holding a predetermined distance between its mark center and a track centerline or between its mark center and a center of a mark of a different burst; and
   the at least one operational data field having a third and a fourth burst, where a mark center cross-track distance between marks of the first and the third bursts as well as a mark center cross-track distance between marks of the second and the fourth bursts is one quarter of a track pitch.

2. The storage device according to claim 1, wherein a mark center cross-track distance between marks of two bursts is about a diameter of said marks.

3. The storage device according to claim 1, wherein a mark center cross-track distance between marks of two bursts is less than a diameter of said marks.

4. The storage device according to claim 1, having two different mark center cross-track distances between marks of two bursts, the first mark center cross-track distance having a value less than a diameter of said marks, and the second mark center cross-track distance having a value equal to a track pitch minus said first mark center cross-track distance.

5. The storage device according to claim 1, wherein a mark center cross-track distance between marks of two bursts is independent from the diameter of said marks.

6. The storage device according to claim 1, wherein a mark center cross-track distance between marks of two bursts is about half of a track pitch.

7. The storage device according to claim 1, wherein said tracking marks have an elongated shape in scanning direction.

8. The storage device according to claim 1, wherein said operational data field comprises timing marks for determining or adjusting the frequency or the phase of reading or writing or erasing pulses applied to probes in said scanning mode.

* * * * *